(12) United States Patent
Peng

(10) Patent No.: US 11,609,001 B2
(45) Date of Patent: Mar. 21, 2023

(54) FOLDABLE TRAVEL HUMIDIFIER

(71) Applicant: Pandian Peng, Shenzhen (CN)

(72) Inventor: Pandian Peng, Shenzhen (CN)

( * ) Notice: Subject to any disclaimer, the term of this patent is extended or adjusted under 35 U.S.C. 154(b) by 620 days.

(21) Appl. No.: 16/692,973

(22) Filed: Nov. 22, 2019

(65) Prior Publication Data

US 2020/0200410 A1 Jun. 25, 2020

(51) Int. Cl.
| | |
|---|---|
| *F24F 6/12* | (2006.01) |
| *B05B 17/06* | (2006.01) |
| *B65D 1/02* | (2006.01) |
| *F24F 6/00* | (2006.01) |
| *B65D 45/32* | (2006.01) |
| *B65D 47/08* | (2006.01) |
| *B65D 53/02* | (2006.01) |

(52) U.S. Cl.
CPC ............ *F24F 6/12* (2013.01); *B05B 17/0615* (2013.01); *B65D 1/0246* (2013.01); *B65D 45/322* (2013.01); *B65D 47/0838* (2013.01); *B65D 53/02* (2013.01); *F24F 2006/008* (2013.01); *F24F 2221/12* (2013.01)

(58) Field of Classification Search
CPC .... F24F 6/12; F24F 2006/008; F24F 2221/12; B05B 17/06
See application file for complete search history.

(56) References Cited

U.S. PATENT DOCUMENTS

| | | | | |
|---|---|---|---|---|
| 4,624,806 | A * | 11/1986 | Koszyk | F24F 6/16 383/7 |
| 6,164,630 | A * | 12/2000 | Birdsell | B01F 23/213 261/DIG. 46 |
| 10,830,469 | B2 * | 11/2020 | Minakian | G01F 23/265 |
| 2012/0222548 | A1 * | 9/2012 | Lev | F24F 6/12 261/119.1 |
| 2018/0326445 | A1 * | 11/2018 | Wang | B05B 17/0615 |

FOREIGN PATENT DOCUMENTS

JP 3201739 U * 12/2015

* cited by examiner

*Primary Examiner* — Lionel Nouketcha

(57) ABSTRACT

A folding travel humidifier, comprising a humidifier main body and a water storage bag arranged on an upper part of the main body of the humidifier; the main body of the humidifier is provided with a power source, a control circuit board and the utility model An atomizer for generating a water mist during vibration; the atomizer is electrically connected to the control circuit board; the water storage bag includes a wave body disposed around the outer circumference of the humidifier main body, and can be folded and stored toward the bottom, and The inner side of the wave crest body is provided with a vent hole for outputting a water mist; the atomizer is located at an intermediate portion of the bottom of the water storage bag.

6 Claims, 4 Drawing Sheets

FOLDABLE TRAVEL HUMIDIFIER

TECHNICAL FIELD OF THE INVENTION

The present invention relates to the technical field of humidifier products, in particular to a high-purpose folding travel humidifier.

BACKGROUND OF THE INVENTION

The humidifier is a device configured to increase or maintain the humidity of the air in the indoor space; the humidifier sprays the water in the state of the droplet or sprays the water to the outside in the form of steam. Currently, the most common types of humidifiers on the market are heated humidifiers, an ultrasonic humidifier, a combined humidifier that combines a heated humidifier with an ultrasonic humidifier, and a centrifugal spray humidifier or a filter vaporized humidifier (configured to pass water through a wet filter.) Different types of humidifiers, such as water vapor generated by evaporation of water, have different functions and effects.

With the improvement of people's living standards, outdoor travel has become a common, how to use the humidifier during travel, and through the improvement of the structure, the travel humidifier can have better convenience of use, which is frequently considered by those skilled in the art. The problem has also been carried out a lot of research and development and experimentation, and achieved good results.

SUMMARY OF THE INVENTION

In order to overcome the problems existing in the prior art, the utility model provides a high-purpose folding travel humidifier with reasonable structural design, outstanding use effect and quick storage and folding. The solution to solve the technical problem of the present invention is to provide a highly practical folding travel humidifier, comprising a humidifier main body and a water storage bag disposed on an upper part of the main body of the humidifier;

The humidifier main body is internally provided with a power source, a control circuit board, and an atomizer for generating a water mist; the atomizer is electrically connected to the control circuit board; the water storage bag includes a surrounding the humidifier host The peak body disposed in the outer circumference is folded and received toward the bottom, and a vent hole for outputting a water mist is opened inside the wave crest body; the atomizer is at an intermediate portion of the bottom of the water storage bag.

In one preferred embodiment, the wave crest body comprises an intermediate body protruding in an arc shape and at least one bent body integrally formed with the intermediate body and respectively connected to the two ends of the intermediate body; the joint portion of the bent body and the intermediate body The thickness is less than the thickness of the intermediate body and the bent body.

In one preferred embodiment, the inner side of the bending body is further provided with a plurality of serrations for reducing the supporting force and facilitating the elastic recovery of the water storage bag.

In one preferred embodiment, the vent hole of the water storage bag is further provided with a limiting ring connected to the inner side of the wave body for stabilizing the wave body on the main body of the humidifier; The mist hole of the water mist output.

In one preferred embodiment, the outer end portion of the peak body has a hook-like structure; and an engaging groove for engaging the portion of the peak-shaped hook-shaped structure is disposed around the outer periphery of the humidifier main body; the peak body passes through the bend The hook structure is snapped into the engaging groove and connected to the humidifier main body.

In one preferred embodiment, the bottom of the humidifier main body is further provided with a rubber plug body for controlling water supply or drainage into the water storage bag; and a rubber plug groove for inserting the rubber plug body is disposed at the bottom of the humidifier main body.

In one preferred embodiment, the bottom of the humidifier main body is further provided with a switch control button electrically connected to the internal control circuit board.

In one preferred embodiment, the water storage bag is a translucent silica gel water storage bag.

In one preferred embodiment, the humidifier main body is further provided with a light-emitting component for enhancing the display effect and electrically connecting to the control circuit board.

In one preferred embodiment, the humidifier main body is further provided with a device for conveying water in the water storage bag to a delivery line of the atomizer portion; and the atomizer is disposed adjacent to the vent hole, and a water storage tank capable of storing a part of the water is further disposed on the lower side of the atomizer. Compared with the prior art, the high-purpose folding travel humidifier of the present invention simultaneously sets the humidifier main body 11 and the water storage bag 12 which is disposed on the upper part of the humidifier main body 11 and can be folded and stored inside. Combined with the internal power supply of the humidifier main body 11, the control circuit board, and the structure design of the atomizer 14.

During actual use, the user can press and fold the water storage bag 12 to the inside according to the specific situation. The water storage bag 12 can be made of a material that can be elastically deformed, such as soft silicone material, with high experience and good folding effect. The design of the design is reasonable, especially suitable for traveling, which enhances the performance of the humidifier product.

BRIEF DESCRIPTION OF THE DRAWINGS

To clearly expound the present invention or technical solution, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

The present invention will be further described in detail below with reference to the accompanying drawings and embodiments. It is understood that the specific embodiments described herein are merely illustrative of the invention and are not intended to limit the invention.

Figure 1:
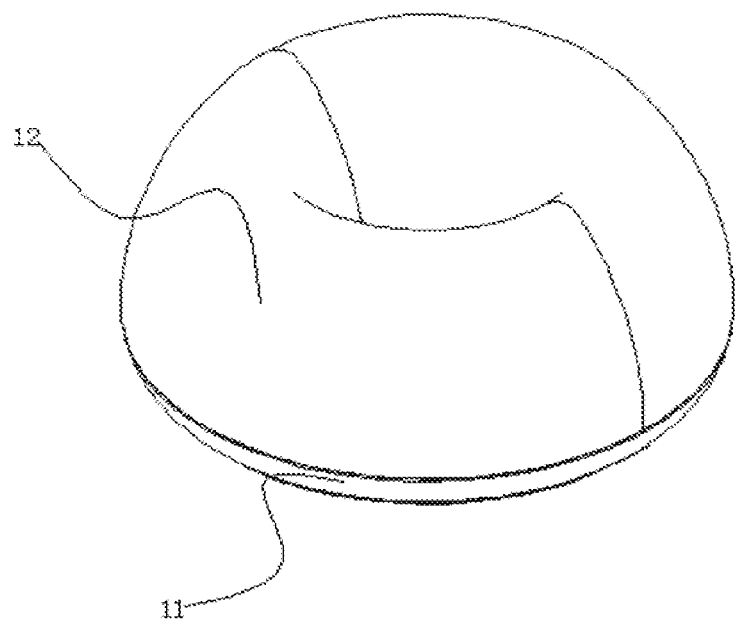
FIG. 1 is a schematic view showing the structure of a three-dimensional state of a highly practical folding travel humidifier according to the present invention.
Figure 2:
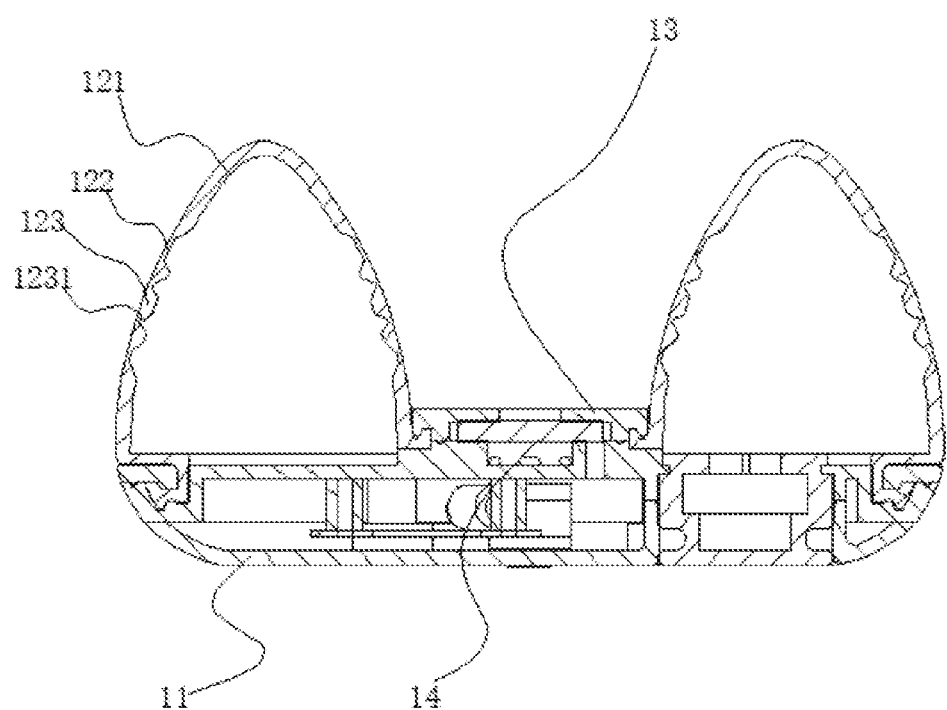
FIG. 2 is a schematic cross-sectional structural view of a highly practical folding travel humidifier of the present invention in a non-folded state.
Figure 3:
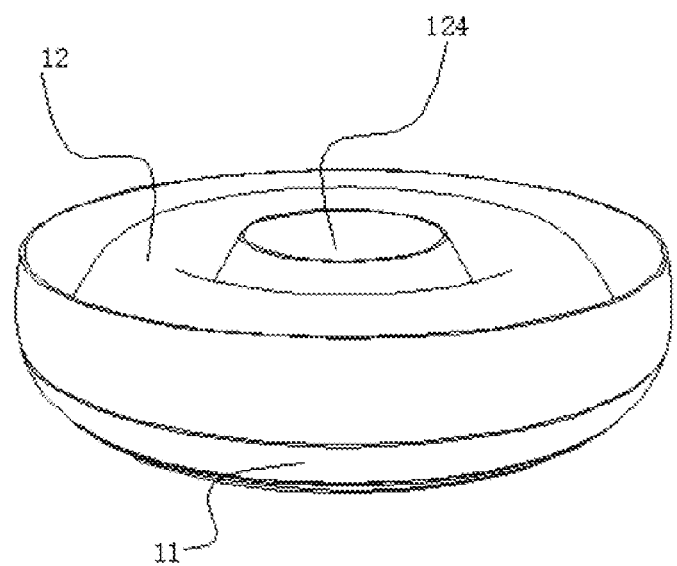
FIG. 3 is a schematic view showing the structure of a folded state of a highly practical folding travel humidifier according to the present invention.
Figure 4:
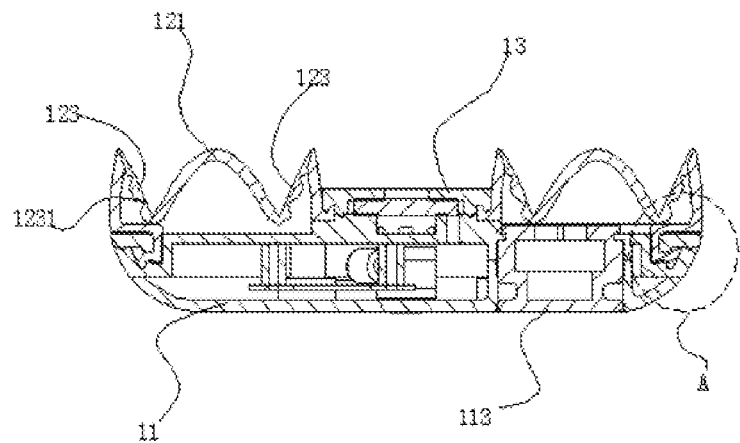
FIG. 4 is a schematic cross-sectional structural view of a highly practical folding travel humidifier according to the present invention.
Figure 5:
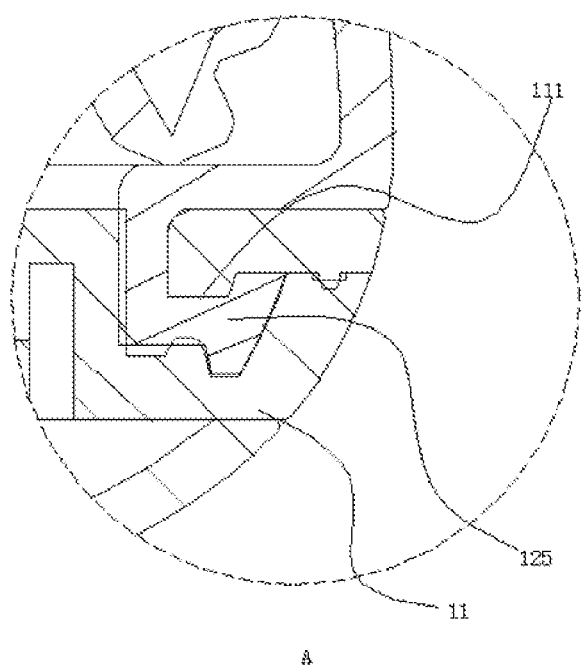
FIG. 5 is an enlarged schematic view of a portion A in FIG. 4.

Referring to FIGS. 1-3, a highly practical folding travel humidifier 1 includes a humidifier main body 11 and a water storage bag 12 disposed at an upper portion of the humidifier main body 11; the humidifier main body 11 is internally provided with a power source, a control circuit board, and an atomizer 14 for generating a water mist; the atomizer 14 is electrically connected to the control circuit board; the water storage bag 12 includes a surrounding body 11 of the humidifier The crest body is disposed on the outer circumference and can be folded and received toward the bottom, and a vent hole 124 for outputting a water mist is opened inside the wave crest body; the atomizer 14 is at an intermediate portion of the bottom of the water storage bag 12.

In the present application, the humidifier main body 11 and the water storage bag 12 which is disposed on the upper portion of the humidifier main body 11 and can be folded and stored inside are disposed, and the internal power supply of the humidifier main body 11, the control circuit board, and the atomizer 14 are combined. In the actual design process, the user can press and fold the water storage bag 12 to the inner side according to the specific situation, and the water storage bag 12 can be made of a material that can be elastically deformed, such as a soft silicone material, and has a high experience. The folding effect is good, the design structure is reasonable, especially suitable for traveling, which enhances the performance of the humidifier product.

In another preferred embodiment, the wave crest body includes an intermediate body 121 protruding in an arc shape and at least one bent body 123 integrally formed with the intermediate body 121 and respectively connected to the two ends of the intermediate body 121; the bent body 123 and the middle portion. The thickness of the joint portion 122 of the body 121 is smaller than the thickness of the intermediate body 121 and the bent body 123. The structural design of the intermediate body 121 and the bent body 123 can better achieve the folding of the water storage bag 12.

In another preferred embodiment, the inside of the bending body 123 is further provided with a plurality of serrations 1231 for reducing the supporting force and facilitating the elastic recovery of the water storage bag 12. The design of the serrations 1231 can make it easier for the user to push the intermediate body 121 to the lower side when pressing the water storage bag 12.

In another preferred embodiment, the vent hole 124 of the water storage bag 12 is further provided with a limiting ring 13 connected to the inner side of the wave body for stabilizing the wave body on the humidifier main body 11; 13 is provided with a fog hole for outputting water mist.

In another preferred embodiment, the outer end portion of the crest body is a hook-like structure 125; and an outer peripheral portion of the humidifier main body 11 is surrounded by an engaging groove 111 for engaging the portion of the crest body hook-like structure 125; The crest body is engaged with the humidifier main body 11 by being hooked into the engaging groove 111 by the hook-like structure 125. The hook-shaped structure 125 not only has high sealing performance, but also facilitates replacement of product parts.

In another preferred embodiment, the bottom of the humidifier main body 11 is further provided with a rubber plug body 113 for controlling water supply or drainage into the water storage bag 12; and a bottom portion of the humidifier main body 11 is provided for embedding the rubber plug body 113. Rubber plug groove.

In another preferred embodiment, the bottom of the humidifier main body 11 is further provided with a switch control button electrically connected to the internal control circuit board.

In another preferred embodiment, the water storage bag 12 is a translucent silicone material storage bag 12.

In another preferred embodiment, the humidifier main body 11 is further provided with a light-emitting component for enhancing the display effect and electrically connecting with the control circuit board. The light-emitting component can be assembled by combining a plurality of LED lights of different illumination colors, and the display effect is excellent.

In another preferred embodiment, the humidifier main body 11 is further provided with a conveying pipeline for conveying water in the water storage bag 12 to the portion of the atomizer 14; and the atomizer 14 is disposed adjacent to the vent hole 124. The lower side of the atomizer 14 is also provided with a water storage tank capable of storing a part of the water. The atomizer 14 can be a vibrating piece.

Compared with the prior art, the high-performance folding travel humidifier 1 of the present invention simultaneously sets the humidifier main body 11 and the water storage bag 12 which is disposed on the upper part of the humidifier main body 11 and can be folded and stored inside. In combination with the internal power supply of the humidifier main body 11, the control circuit board, and the structure of the atomizer 14, during actual use, the user can press and fold the water storage bag 12 to the inner side according to the specific situation, and the water storage bag 12 can be soft. Made of silicone material and other materials that can be elastically deformed, it has a high degree of experience and good folding effect. The design of the design is reasonable, especially suitable for traveling, which enhances the performance of the humidifier.

The embodiments of the present invention described above are not intended to limit the scope of the present invention. Any modifications, equivalent substitutions and improvements made within the spirit and scope of the invention are intended to be included within the scope of the appended claims.

The invention claimed is:
1. A folding travel humidifier, comprising:
   a humidifier main body and a water storage bag disposed on an upper portion of the humidifier main body, wherein the humidifier main body is provided with a power source and, a control circuit board, and an atomizer,
   wherein the atomizer is electrically connected to the control circuit board;
   wherein the water storage bag includes a wave crest body, wherein the wave crest body further comprising an arc-shaped intermediate body, a bent body integrally formed with the intermediate body, and a joint portion, wherein the bent body is further provided with a plurality of serrations, wherein the bent body is con- nected to the intermediate body through the joint portion, wherein the bent body can be folded toward the main body, wherein a vent hole for outputting a water mist is disposed inside the wave crest body, wherein the atomizer is close to the bottom of the water storage bag.

2. The folding travel humidifier according of claim 1, wherein the water storage bag is further provided with a connection with an inner side of the wave crest body, wherein a limiting ring is disposed on the main body of the humidifier.

3. The folding travel humidifier of claim 2, wherein the outer end portion of the crest body has a hook-like structure and is disposed around the outer periphery of the humidifier main body for snapping in the engaging groove of the peak-shaped hook-shaped structure portion, wherein the wave-shaped body is hooked into the engaging groove by the hook-like structure and connected to the humidifier main body.

4. The folding travel humidifier according of claim 1, wherein the bottom of the humidifier main body is further provided with a rubber plug body for controlling water supply or drainage into the water storage bag, wherein a rubber plug groove for inserting the rubber plug body is opened at the bottom of the body.

5. The folding travel humidifier of claim 1, wherein the water storage bag is a translucent silicone material storage bag.

6. The folding travel humidifier according of claim 1, wherein the vent hole portion of the water storage bag is further provided with a connection with the inner side of the wave crest body for stabilizing the wave crest body, wherein a limiting ring is disposed on the main body of the humidifier.

* * * * *